United States Patent [19]

Horn

[11] Patent Number: 4,840,494

[45] Date of Patent: Jun. 20, 1989

[54] CALIBRATED TEMPERATURE SENSOR AND METHOD OF CALIBRATING SAME

[75] Inventor: Petr Horn, Oberhasli, Switzerland

[73] Assignee: Albert Koch, Einsiedeln, Switzerland

[21] Appl. No.: 106,678

[22] Filed: Oct. 13, 1987

Related U.S. Application Data

[63] Continuation-in-part of Ser. No. 786,955, Oct. 1, 1985, abandoned.

[30] Foreign Application Priority Data

Feb. 1, 1984 [CH] Switzerland .......................... 462/84
Jan. 8, 1985 [CH] Switzerland ............................ 54/85

[51] Int. Cl.$^4$ ..................... G01K 15/00; G01K 7/16
[52] U.S. Cl. ..................................... 374/1; 338/195; 374/178
[58] Field of Search .................. 374/1, 178; 338/195; 29/612, 620

[56] References Cited

U.S. PATENT DOCUMENTS

| | | | |
|---|---|---|---|
| 2,261,667 | 11/1941 | Stroszeck | 201/63 |
| 3,405,381 | 10/1968 | Zandman et al. | 338/254 |
| 4,041,440 | 8/1977 | Davis et al. | 338/195 |
| 4,146,867 | 3/1979 | Blangeard et al. | 338/195 |
| 4,172,249 | 10/1979 | Szwarc | 338/195 |
| 4,201,970 | 5/1980 | Onyshkevych | 338/195 |
| 4,228,418 | 10/1980 | Piedmont et al. | 338/195 |
| 4,332,081 | 6/1982 | Francis | 29/612 |
| 4,375,056 | 2/1983 | Baxter et al. | 338/25 |
| 4,386,460 | 6/1983 | Klockow | 29/593 |

FOREIGN PATENT DOCUMENTS

| | | |
|---|---|---|
| 1474731 | 5/1977 | United Kingdom . |
| 2018036 | 10/1979 | United Kingdom . |
| 1566151 | 4/1980 | United Kingdom . |

OTHER PUBLICATIONS

Y. C. Kiang et al., "IBM Technical Disclosure Bulletin," 9/1982, pp. 2003-2004.

Primary Examiner—William A. Cuchlinski, Jr.
Assistant Examiner—Thomas B. Will
Attorney, Agent, or Firm—Walter C. Farley

[57] ABSTRACT

A process of calibrating a temperature sensor includes bringing the sensor to thermal equilibrium at a selected temperature, measuring the resistance of the sensor, calculating which combination of trimming paths need be interrupted and then separately interrupting those paths apart from the measuring location. A sensor with selectably interruptable trimming paths is disclosed.

4 Claims, 1 Drawing Sheet

CALIBRATED TEMPERATURE SENSOR AND METHOD OF CALIBRATING SAME

This is a continuation-in-part of application Ser. No. 786,955, filed Oct. 1, 1985, and now abandoned, the entire content of which is hereby incorporated by reference.

FIELD OF THE INVENTION

This invention relates to precision temperature sensors of the type wherein fine paths of conductive material of known resistance are formed on an electrically non-conductive substrate in specific patterns to result in at least one, but usually many, highly accurate sensors on the substrate, and to a method of rapidly and accurately calibrating the sensors.

BACKGROUND OF THE INVENTION

The requirements with respect to temperature sensors and to resistors differ very significantly and consequently lead to different manufacturing processes. Thus, although a measuring accuracy of, for example, 1% leads to adequately small tolerances for resistors, in the case of Pt-100 temperature sensors with a precision of 0.1° C., a measuring accuracy with a maximum 0.02% variation for a temperature stability of 0.05% is required. This accuracy, which is higher by a factor of 50, leads in the field of aligning or adjusting temperature sensors, to different new problems of which the known processes have not yet taken account. Whereas in the manufacture of resistors the heat produced by the adjustment plays little or no part, this heat generation constitutes the central problem when adjusting temperature sensors. For temperature sensors with an accuracy in the indicated range of 0.01° C. after manufacture, it is necessary to provide a thermostat with a high thermal stability, i.e., a divergence of less than 0.05° C. and wherein, due to the high accuracy requirement, there is no air movement and no entry of light.

Laser adjusting devices of the prior art measure the resistance of the temperature sensor during trimming and therefore are not suited for commercial purposes. All standard methods contain a step-by-step trimming and measurement, i.e., steps of measurement, partial trim, measurement again, further trim, etc., during adjustment which needs a lot of time. This aspect is very important in connection with high volume commercial production applications. If there is only one temperature sensor to adjust, it would not be so important if the temperature stabilization of the substrate with the sensor takes, for example, 10 seconds before the "trimming-measurement" process may be started and the process itself takes maybe 50 seconds. But if there are 100 or 200 temperature sensors to trim an adjustment of the sensors one after another would take hours.

Furthermore, many modern applications with temperature sensors require very small sensors. Thus, the dimensions of the trimming path should be as small as possible. It is not possible to adjust such narrow trimming paths with functional adjustment in a satisfactory manner. Even if some known methods use a digital trimming in a first step a subsequent second step for fine trimming is required. For this reason, these methods using a "widened part" for analog adjustment lead to a compromise between the size of the sensor and its precision.

SUMMARY OF THE INVENTION

It is the object of the present invention to provide a method for calibrating temperature sensors and temperature sensors produced by this method, which eliminates the aforementioned disadvantages and which permits a very rapid and therefore economic calibration for high volume commercial production application with an accuracy of the sensors of at least 0.1% of the desired value wherein the sensors have very small dimensions.

DESCRIPTION OF THE PREFERRED EMBODIMENT

Figure 1A:
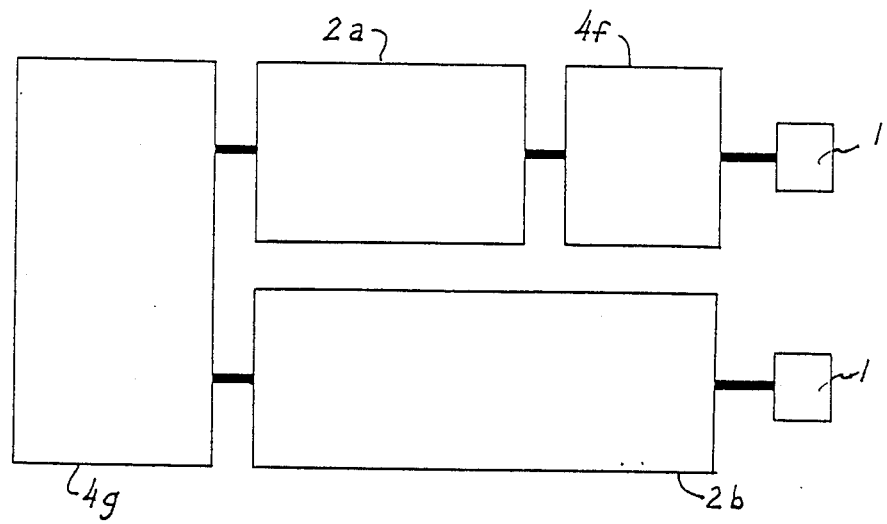
FIG. 1A is a schematic block diagram of a printed conductor structure with two trimming paths for two subsequent trimming steps.
Figure 1B:
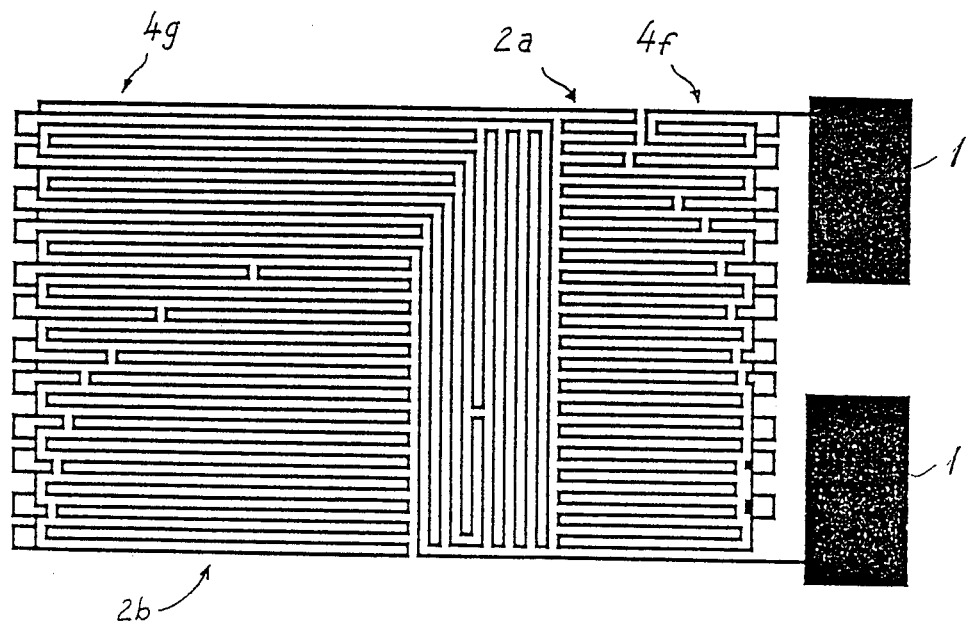
FIG. 1B is a layout of an embodiment of a single temperature sensor.

To simplify matters, FIGS. 1A and 1B show only one temperature sensor. It has to be understood that in practice a hundred or more sensors are provided together on the same substrate.

If every temperature sensor is measured and trimmed separately, i.e., one after another (as is common in the prior art), the individual measurement times accumulate to a large total. If, for example, the substrate is stabilized after ten seconds a first partial trim can be done. Since the substrate is heated while being adjusted (e.g., using a laser beam), one must wait until the temperature again reaches equilibrium and therefore each subsequent step of cutting and checking needs additional time. The main problem regarding the measurement of the resistance of the sensors was the temperature stabilization during the period of measurement because of heating effects caused by trimming. Thus, the trimming of just one thermosensor may take several minutes if conventional methods are used. One may easily recognize that these methods of trimming can't be used for commercial applications. The new concept of the invention, in contrary, allows the simultaneous measurement of a plurality of temperature sensors which saves a lot of time. Temperature problems are avoided.

To reduce the time of trimming and measurement U.S. Pat. No. 4,041,440 uses paths which are completely severed and the portions for adjustment where severed are sufficiently spaced from remaining active thermistor portions to avoid deleterious heating or cooling effects on them due to the trimming operation. This leads of course to sensors with large dimensions, in the order of centimeters, and analog trimming is still required.

FIG. 1A shows schematically the design of the temperature sensor. On the right-hand side of the drawing two contacts 1 are shown. The resistance of the sensor is formed by resistances 2a and 2b. Two partial structures or calibration sections 4g and 4f are placed in series with these resistances. FIG. 1B shows more in detail an embodiment of a single temperature sensor. The structures 2a, 2b, 4f, and 4g are indicated in FIG. 1B with arrows corresponding to their locations, FIG. 1A. The trimming paths as well as the resistance paths 2a, 2b have a width of several micrometers e.g., they are 20 μm wide which makes it possible to design very small sensors. Since the width of the trimming paths is that narrow, at most 30 μm, it would not be possible to use conventional analog trimming because it is impossible to provide a further cut into these paths. The present invention solves these problems with a digital precalculation of the trimming paths to be cut and allows a time saving mass production of such sensors.

The method for adjusting the temperature sensors contains the steps of prior calculation of the trimming paths to be interrupted, measuring the total resistances of each sensor and subsequent trimming in a calibration device. The steps of measuring and trimming are repeated to achieve a fine calibration with an accuracy better than 0.1%. Any analog adjustment (which would be impossible anyhow if sensors according to FIG. 1 are used) is rendered superfluous by the method of the present invention. The fine calibration is achieved by corresponding precalculation of the trimming paths to be interrupted. The trimming paths are designed in such manner that the value of the sensor resistance is increased by at least 20% if all trimming paths of the partial structure 4g are interrupted in the first trimming step. This allows one to adjust temperature sensors with a quite wide process tolerance. The finest calibration step of the partial structure 4f allows an incremental increase of the total resistance value of less than 0.5%. The coarse calibration (using the trimming paths of partial structure 4g) and the fine calibration (using those of partial structure 4f) together result in the final desired precision of the sensor.

With respect to process tolerances of the sensors on the substrate, the two calibration steps have to be coordinated. If, for example, the resistances of the sensors vary 30% around a given value $R_0$, the total increase of each resistance value should reach the final value $R_f$. The trimming paths of the partial structure 4g as well as of structure 4f show individual tolerances which have to be taken into account while determining the trimming paths to be interrupted by coarse calibration. Therefore, the precalculation of these trimming paths 4g has to operate with a value less than $R_f$, e.g., 96% of $R_f$. If, for example, the tolerance between precalculated trimming paths of partial structure 4g and the actual values of their resistance values differ by a total of 3% a fine calibration is still possible. Since the fine calibration normally allows a total adjustment of the resistance value by at least 5% the sensor may be trimmed to 100% of $R_f$ with an accuracy of at least 0.5%. It is advisable to select as a goal a value of (100%−p/2) of $R_f$ with the coarse calibration, wherein p equals the maximum total increase by fine trimming (e.g., 5%). In such manner the reject rate (sensors with a resistance greater than $R_f$ after coarse calibration) is very low and the number of trimming paths to be cut is held low. If, in contrast to this, on tries to achieve the exact value of $R_f$ (i.e., 100%) with the coarse calibration a great number of sensors would be "adjusted" to a value higher than $R_f$ and thus a fine calibration would be impossible.

The following coding is a possible sequence of increases:

The initial resistance R of each sensor is capable of being increased during coarse trimming by increments of 30%, 22%, 18%, 15% ... 0.4% of its value (Total e.g. 70%)

and during fine trimming increments of 3%, 2.6%, 2.1%, 1.8% ... 0.08% of its value (Total e.g. 8%).

An initial resistance $R_0$ thus may be altogether increased by 78%. It may be easily concluded that sensors with a resistance within the range of 1/1.78=56.2% to 100% of the desired value $R_f$ may be adjusted (i.e. if all trimming paths are interrupted it would be possible to increase a value of 56.2% of $R_f$ by 43.8% of $R_f$ up to a value of 100%).

It is advantageous to design the trimming paths in each partial structure in such a manner that the row of interruptions causes the resistance to be increased in increments such that, starting with the smallest increment of increase caused by an interruption, each subsequent interruption step causes a percentage increase of the total resistance which is equal to or less than the sum of the percentage increase of the foregoing increments plus the finest increment (if all preceding interruptions were made). With this design approach, the worst case resolution is the finest step.

The following table gives an example of this approach.

| Step No. | Increase (%) | sum (%) | sum + step 1 (%) |
| --- | --- | --- | --- |
| 1 | 0.05 | 0.05 | 0.10 |
| 2 | 0.08 | 0.13 | 0.18 |
| 3 | 0.1 | 0.23 | 0.28 |
| 4 | 0.25 | 0.48 | 0.53 |
| 5 | 0.42 | 0.90 | 0.95 |
| 6 | 0.6 | 1.50 | 1.55 |
| 7 | 1.55 | 3.05 | 3.10 |
| 8 | 2.8 | 5.85 | 5.90 |
| 9 | 5.75 | 11.60 | 11.65 |
| 10 | 10.87 | 22.47 | |

The method as described above, using the example of a single sensor, shows many advantages when used for industrial mass production of temperature sensors. The precalculation of the trimming paths to be interrupted allows a complete separation of the measuring process from the adjustment process and therefore significance is no longer attached to the heating caused, for example, by the use of a laser. Even the device for measuring and the device for trimming are separated, i.e., two apparatuses are provided. For completeness a numerical example of the method according to invention is described in the following.

A substrate with 120 temperature sensors is supplied to a measurement apparatus. The temperature is stabilized to a selected temperature, such as its intended operating temperature, with a maximum variation of 0.05% after which all 120 sensors are contacted and measured at the same time and the measured values are evaluated. Because of the high accuracy requirement regarding the temperature stability, an environment in which there is no movement of air and no light entering this environment is required. Since the coding of the partial structure 4g is known (obtained by calculation or a measurement of a single or a representative sample of sensors) it is easily possible to calculate the trimming paths of structure 4g which have to be interrupted. If the value of the measured sensor x equals 72% of the desired value $R_f$ it has to be adjusted up to, for example, 96% of $R_f$. The substrate is supplied to an adjustment equipment and all sensors may be trimmed in one and the same operation cycle. In such manner 120 temperature sensors are trimmed in less than 60 to 120 seconds. Afterwards the substrate is again supplied to the measurement apparatus and the values of the coarse trimmed sensors are measured. The measurements are used in similar way to determine the trimming paths of structure 4f by fine calibration. It is obvious that the measurement apparatus and the adjustment equipment may be used at the same time whereby several substrates with a plurality of sensors on each of them are processed by turns.

What is claimed is:

1. A process for calibrating temperature sensors having trimming paths for calibrating purposes comprising the steps of forming a substrate having a plurality of temperature sensors thereon;

stabilizing the temperature of the substrate and sensors at a preselected equilibrium temperature with variations of less than 0.1° C.;

concurrently measuring with a measuring device the temperature-dependent total resistance $R_o$ of all sensors on the substrate;

calculating and selecting a first combination of interruptions of trimming paths based on said measured total resistance $R_o$ for each sensor wherein the calculated theoretical resistance increase expected to result from the selected interruptions approaches the difference between a desired resistance value $R_f$ and the measured initial value $R_o$;

subsequently interrupting the selected paths in an adjusting device separate from the measuring device;

again stabilizing the temperature of the substrate and sensors at the preselected equilibrium temperature with variations of less than 0.1° C.;

again measuring the resistance $R_o$ of all sensors;

calculating and selecting a second combination of interruptions of trimming paths based on the last measured total resistance $R_o$ for each sensor wherein the calculated theoretical resistance increase is expected to increase the total resistance to the desired resistance value $R_f$; and subsequently interrupting the second combination of selected paths in the separate adjusting device, and wherein each said sensor includes a first partial structure having a first plurality of trimming paths having different values for the first interrupting step and a second partial structure having a second plurality of trimming paths having different values for the second interrupting step, the sensor being formed so that interruption of all trimming paths of the first partial structure increases the total resistance $R_o$ by at least 20%, the calculation and selection of the first combination of trimming paths being made such that the total resistance measured after the first interruption of selected paths is less than the final desired resistance value $R_f$ by half the amount of the total possible resistance increase achievable by interrupting all paths in the second partial structure.

2. A process according to claim 1 wherein the sensors are formed so that the smallest incremental increase achievable with the first partial structure is less than 0.5% of the total resistance $R_0$.

3. A process according to claim 2 wherein the sensors are formed so that the smallest incremental increase achievable with the second partial structure is no greater than one-half the smallest incremental increase achievable with the first partial structure.

4. A process according to claim 3 wherein the smallest incremental increase achievable with the second partial structure is less than 0.1% of the total resistance $R_0$.

* * * * *